(12) United States Patent
Takahashi et al.

(10) Patent No.: US 12,549,004 B2
(45) Date of Patent: Feb. 10, 2026

(54) CONTROL DEVICE, MOVING BODY, CONTROL METHOD, AND NON-TRANSITORY COMPUTER-READABLE MEDIUM STORING CONTROL PROGRAM

(71) Applicant: TOYOTA JIDOSHA KABUSHIKI KAISHA, Toyota (JP)

(72) Inventors: Nobuaki Takahashi, Toyota (JP); Ruibai Li, Toyota (JP); Hiroaki Hanzawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 18/492,077

(22) Filed: Oct. 23, 2023

(65) Prior Publication Data

US 2024/0162706 A1    May 16, 2024

(30) Foreign Application Priority Data

Nov. 15, 2022   (JP) .................................. 2022-182838

(51) Int. Cl.
*H02J 3/00*     (2006.01)
*B60R 16/033*   (2006.01)

(52) U.S. Cl.
CPC .............. *H02J 3/00* (2013.01); *B60R 16/033* (2013.01); *H02J 2310/10* (2020.01); *H02J 2310/40* (2020.01); *Y02T 10/70* (2013.01)

(58) Field of Classification Search
CPC ...... H02J 3/00; H02J 2310/10; H02J 2310/40; H02J 7/007; H02J 7/00032; H02J 7/00308; H02J 7/0063; B60R 16/033
See application file for complete search history.

(56) References Cited

U.S. PATENT DOCUMENTS 9,735,703 B2 *   8/2017   Dent ....................... H02J 3/007

FOREIGN PATENT DOCUMENTS

JP          2010115035 A      5/2010

* cited by examiner

*Primary Examiner* — Michael C Zarroli
(74) *Attorney, Agent, or Firm* — Dickinson Wright, PLLC

(57) ABSTRACT

A control device includes: a control section that, on the basis of a first supplied electric power maximum value computed in accordance with a radiation amount with respect to an electric power supplying device, and a second supplied electric power maximum value computed from temporal deterioration of the electric power supplying device, determines an electric power supply maximum value that is a maximum value of electric power to be supplied from the electric power supplying device to at least one external device.

7 Claims, 7 Drawing Sheets

CONTROL DEVICE, MOVING BODY, CONTROL METHOD, AND NON-TRANSITORY COMPUTER-READABLE MEDIUM STORING CONTROL PROGRAM

CROSS-REFERENCE TO RELATED APPLICATION

This application claims priority under 35 USC 119 from Japanese Patent Application No. 2022-182838, filed on Nov. 15, 2022, the disclosure of which is incorporated by reference herein.

BACKGROUND

Technical Field

The present disclosure relates to a control device, a moving body, a control method, and a non-transitory computer-readable medium storing a control program.

Related Art

Japanese Patent Application Laid-Open (JP-A) No. 2010-115035, for example discloses a battery protecting device that, even in a case in which surplus electric power is generated at the time of regeneration, reliably consumes that excess electric power so as to enable prevention of overvoltage of the battery. This battery protecting device has a battery that is charged by regenerative electric power, an electric load that consumes the regenerative electric power, and control section controlling the regenerative electric power that is supplied to the battery and the electric load. The control section sets a target maximum output value of the regenerative electric power to be smaller, by a predetermined value, than the electric power consuming capability of the electric load.

By the way, at a moving body such as a lunar surface rover or the like, appropriate control of the consumed electric power is necessary in order to suppress the generation of heat. There are cases in which this type of moving body is used in environments that are greatly affected by radiation such as in space. Therefore, the performances of the onboard electric power supplying device fluctuate greatly due to the effects of radiation. Thus, it is desirable to appropriately determine the electric power that can be outputted from the electric power supplying device.

SUMMARY

The present disclosure provides a control device, a moving body, a control method, and a non-transitory computer-readable medium storing a control program that may determine an appropriate electric power that can be outputted, in an environment in which the effects of radiation are great.

A first aspect of the present disclosure is a control device having a control section that, on the basis of a first supplied electric power maximum value computed in accordance with a radiation amount with respect to an electric power supplying device, and a second supplied electric power maximum value computed from temporal deterioration of the electric power supplying device, determines an electric power supply maximum value that is a maximum value of electric power to be supplied from the electric power supplying device to at least one external device.

In accordance with the first aspect of the present disclosure, on the basis of the first supplied electric power maximum value computed in accordance with the radiation amount with respect to the electric power supplying device, and the second supplied electric power maximum value computed from temporal deterioration of the electric power supplying device, the control section determines the electric power supply maximum value that is the maximum value of the electric power that is to be supplied from the electric power supplying device to at least one external device. Due thereto, in an environment in which effects of radiation are great, appropriate electric power that can be outputted, may be determined.

In a second aspect of the present disclosure, in the first aspect, in a case in which the radiation amount is less than a threshold value, the control section may determine the second supplied electric power maximum value as the electric power supply maximum value, and, in a case in which the radiation amount is greater than or equal to the threshold value, the control section may determine the lower of the first supplied electric power maximum value and the second supplied electric power maximum value as the electric power supply maximum value.

In accordance with the second aspect of the present disclosure, in a case in which the radiation amount is less than the threshold value, the control section determines the second supplied electric power maximum value as the electric power supply maximum value. In a case in which the radiation amount is greater than or equal to the threshold value, the control section determines the lower of the first supplied electric power maximum value and the second supplied electric power maximum value as the electric power supply maximum value. Due thereto, suitable electric power that can be outputted may be determined in accordance with the radiation amount.

In a third aspect of the present disclosure, in the first or second aspect, the control section may control the electric power supplying device to supply electric power simultaneously to plural external devices within a range in which the electric power supply maximum value is not exceeded.

In accordance with the third aspect, the control section controls the electric power supplying device to supply electric power simultaneously to the plural external devices within a range in which the electric power supply maximum value is not exceeded. Due thereto, the activation times of plural external devices may be shortened.

In a fourth aspect of the present disclosure, in the first or second aspect, the control section may control the electric power supplying device to supply electric power to plural external devices respectively in a manner of being shifted temporally, within a range in which the electric power supply maximum value is not exceeded.

In accordance with the fourth aspect of the present disclosure, the control section controls the electric power supplying device to supply electric power to the plural external devices respectively in a manner of being shifted temporally, within a range in which the electric power supply maximum value is not exceeded. Lengthening of the life of the electric power supplying device may thereby be devised.

In a fifth aspect of the present disclosure, in any one of the first through fourth aspects, the control section may estimate the radiation amount with respect to the electric power supplying device on the basis of error information of the electric power supplying device.

In accordance with the fifth aspect of the present disclosure, the control section estimates the radiation amount with respect to the electric power supplying device on the basis of error information of the electric power supplying device. Due thereto, the radiation amount may be estimated accurately.

A sixth aspect of the present disclosure is a moving body including: the control device of any one of the first aspect through the fourth aspect; and an electric power supplying device controlled by the control device.

In accordance with the sixth aspect of the present disclosure, on the basis of the first supplied electric power maximum value computed in accordance with the radiation amount with respect to the electric power supplying device, and the second supplied electric power maximum value computed from temporal deterioration of the electric power supplying device, the control section determines the electric power supply maximum value that is the maximum value of the electric power that is to be supplied from the electric power supplying device to at least one external device. Due thereto, in the same way as in the above-described first aspect, appropriate electric power that can be outputted, in an environment in which effects of radiation are great, may be determined at the moving body.

A seventh aspect of the present disclosure is a control method including, on the basis of a first supplied electric power maximum value computed in accordance with a radiation amount with respect to an electric power supplying device, and a second supplied electric power maximum value computed from temporal deterioration of the electric power supplying device, a control device determines an electric power supply maximum value that is a maximum value of electric power to be supplied from the electric power supplying device to at least one external device.

In accordance with the seventh aspect of the present disclosure, on the basis of the first supplied electric power maximum value computed in accordance with the radiation amount with respect to the electric power supplying device, and the second supplied electric power maximum value computed from temporal deterioration of the electric power supplying device, the control device determines the electric power supply maximum value that is the maximum value of the electric power that is to be supplied from the electric power supplying device to at least one external device. Due thereto, in the same way as in the above-described first aspect, appropriate electric power that can be outputted, in an environment in which effects of radiation are great, may be determined.

An eighth aspect of the present disclosure is a non-transitory computer-readable medium storing a control program for causing a computer to execute a process, the process including: on the basis of a first supplied electric power maximum value computed in accordance with a radiation amount with respect to an electric power supplying device, and a second supplied electric power maximum value computed from temporal deterioration of the electric power supplying device, execute determination of an electric power supply maximum value that is a maximum value of electric power to be supplied from the electric power supplying device to at least one external device.

In accordance with the eighth aspect of the present disclosure, on the basis of the first supplied electric power maximum value computed in accordance with the radiation amount with respect to the electric power supplying device, and the second supplied electric power maximum value computed from temporal deterioration of the electric power supplying device, a computer determines the electric power supply maximum value that is the maximum value of the electric power that is to be supplied from the electric power supplying device to at least one external device. Due thereto, in the same way as in the above-described first aspect, appropriate electric power that can be outputted, in an environment in which effects of radiation are great, may be determined, at a moving body.

In accordance with the above-described aspects, the control device, the moving body, the control method, and the non-transitory computer-readable medium storing a control program of the present disclosure may determine an appropriate electric power that can be outputted, in an environment in which the effects of radiation are great.

BRIEF DESCRIPTION OF THE DRAWINGS

Exemplary embodiments will be described in detail based on the following figures, wherein.

DETAILED DESCRIPTION

Examples of forms for embodying the technique of the present disclosure are described in detail hereinafter with reference to the drawings. Note that structural elements and processings whose actions, operations and functions have the same workings are denoted by the same numbers throughout all of the drawings, and there are cases in which redundant description is omitted as appropriate. The respective drawings are merely for schematical illustration to the extent of enabling sufficient understanding of the technique of the present disclosure. Accordingly, the technique of the present disclosure is not limited only to the illustrated examples. Further, in the present exemplary embodiments, there are cases in which description of structures that are not directly related to the present disclosure and known structures is omitted.

First Exemplary Embodiment

Figure 1:
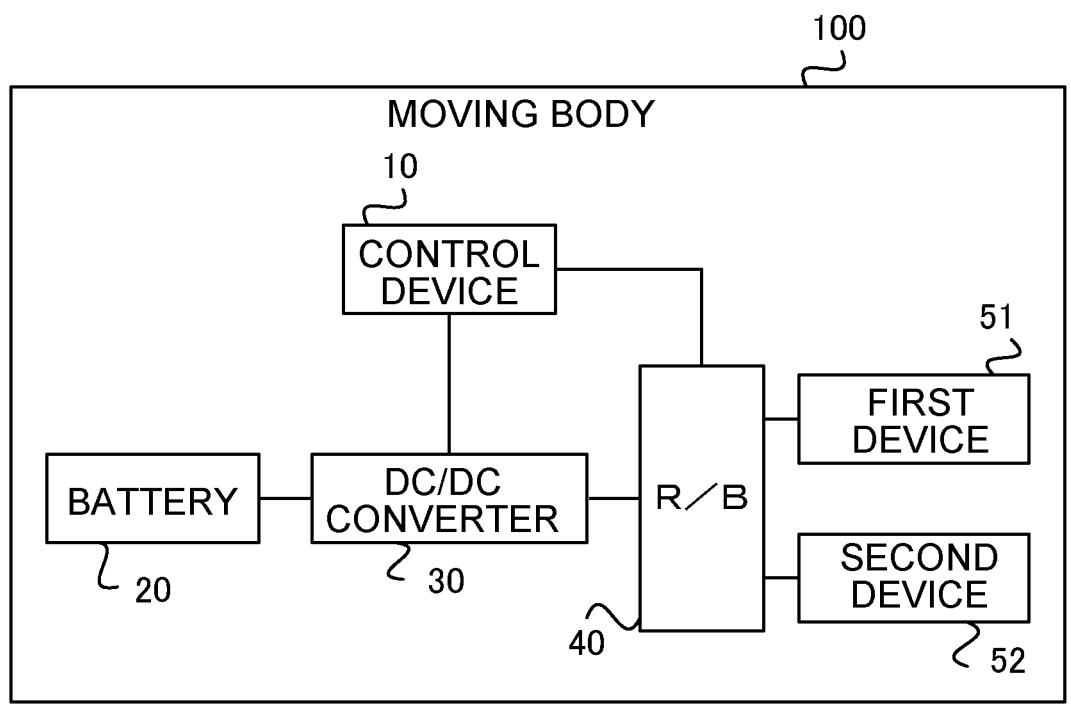
FIG. 1 is a block drawing illustrating an example of the structure of a moving body relating to a first exemplary embodiment.

FIG. 1 is a block drawing illustrating an example of the structure of a moving body 100 relating to a first exemplary embodiment.

As illustrated in FIG. 1, the moving body 100 relating to the present exemplary embodiment has a control device 10, a battery 20, a DC/DC converter 30, a relay block (RB) 40, a first device 51, and a second device 52. Note that the DC/DC converter 30 is an example of the electric power supplying device. The first device 51 and the second device 52 are examples of the external devices. Further, the first device 51 and the second device 52 are not limited to two devices, and there may be one or more external devices.

The moving body 100 uses CAN (Controller Area Network) as the communication protocol. CAN is a protocol used in transferring, for example, the rotational speed of the engine, the state of the brakes, information relating to fault diagnoses, and the like.

The control device 10 is connected via busses to the DC/DC converter 30 and the R/B 40, respectively. The control device 10 is configured as, for example, a vehicle computer for controlling the respective operations of the moving body 100.

The battery 20 is the electric power source of the moving body 100, and is connected to the DC/DC converter 30.

The DC/DC converter 30 is connected to the battery 20, and supplies electric power, which is supplied from the battery 20, via the R/B 40 to the first device 51 and the second device 52 respectively. The DC/DC converter 30 is controlled by the control device 10.

The R/B 40 is connected to the first device 51 and the second device 42 that are examples of the external devices, and switches the ON/OFF states of the supplying of electric power to the first device 51 and the second device 52, respectively. The R/B 40 is controlled by the control device 10.

The first device 51 and the second device 52 respectively are devices needed for execution of predetermined processings (e.g., engine control processing, braking processing, processings relating to missions in space).

Note that, although not illustrated, the moving body 100 includes, for example, a motor, a radiator, solar battery panels, and driving portions such as wheels and the like, and a communication section for carrying out wireless communication with a terrestrial base station.

Figure 2:
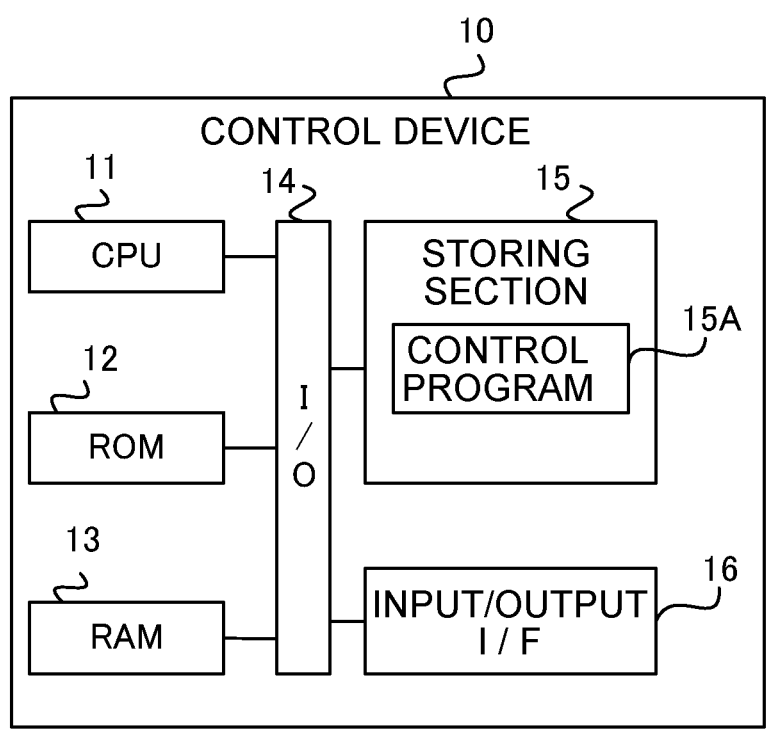
FIG. 2 is a block drawing illustrating an example of the electrical structures of a control device relating to the first exemplary embodiment.

FIG. 2 is a block drawing illustrating an example of electrical structures of the control device 10 relating to the first exemplary embodiment.

As illustrated in FIG. 2, the control device 10 relating to the present exemplary embodiment has a CPU (Central Processing Unit) 11, a ROM (Read Only Memory) 12, a RAM (Random Access Memory) 13, an input/output section (I/O) 14, a storing section 15, and an input/output interface (input/output I/F) 16.

The CPU 11, the ROM 12, the RAM 13 and the I/O 14 are respectively connected via busses. Respective functional sections including the storing section 15 and the input/output I/F 16 are connected to the I/O 14. These respective functional sections can communicate with the CPU 11 via the I/O 14.

A control circuit is configured by the CPU 11, the ROM 12, the RAM 13, and the I/O 14. The control circuit may be configured as a sub control circuit that controls some of the operations of the control device 10, or may be configured as a portion of a main control circuit that controls the operations of the entire control device 10. For example, an integrated circuit such as an LSI (Large Scale Integrated) circuit or the like, or an IC (Integrated Circuit) chip set, is used as some of or all of the respective blocks of the control circuit. Individual circuits may be used for the above-described respective blocks, or circuits that integrate some of or all of the above-described respective blocks may be used. The above-described respective blocks may be provided by being integrated together, or some of the blocks may be provided separately. Or, a portion of each of the above-described respective blocks may be provided separately. The integrating of the control circuit is not limited to LSI, and a dedicated circuit or a general-purpose processor may be used.

An HDD (Hard Disk Drive), an SSD (Solid State Drive), a flash memory or the like for example is used as the storing section 15. A control program 15A relating to the present exemplary embodiment is stored in the storing section 15. Note that this control program 15A may be stored in the ROM 12.

For example, the control program 15A may be installed in advance in the control device 10. The control program 15A may be stored on a non-volatile storage medium, or may be distributed via a network, and realized be being installed appropriately in the control device 10. Note that a CD-ROM (Compact Disc Read Only Memory), a magneto-optical disk, an HDD, a DVD-ROM (Digital Versatile Disc Read Only Memory), a flash memory, a memory card and the like are considered as examples of non-volatile storage media.

The input/output OF 16 is an interface for connecting with the DC/DC converter 30 and the RB 40, respectively.

By the way, as described above, there are cases in which the moving body 100 is utilized in an environment in which the effects of radiation are great, such as in space. Therefore, the performances of the DC/DC converter 30, which is an example of the installed electric power supplying device, fluctuate greatly due to the effects of radiation. Therefore, it is preferable to appropriately determine the electric power that can be outputted by the DC/DC converter 30.

Figure 3:
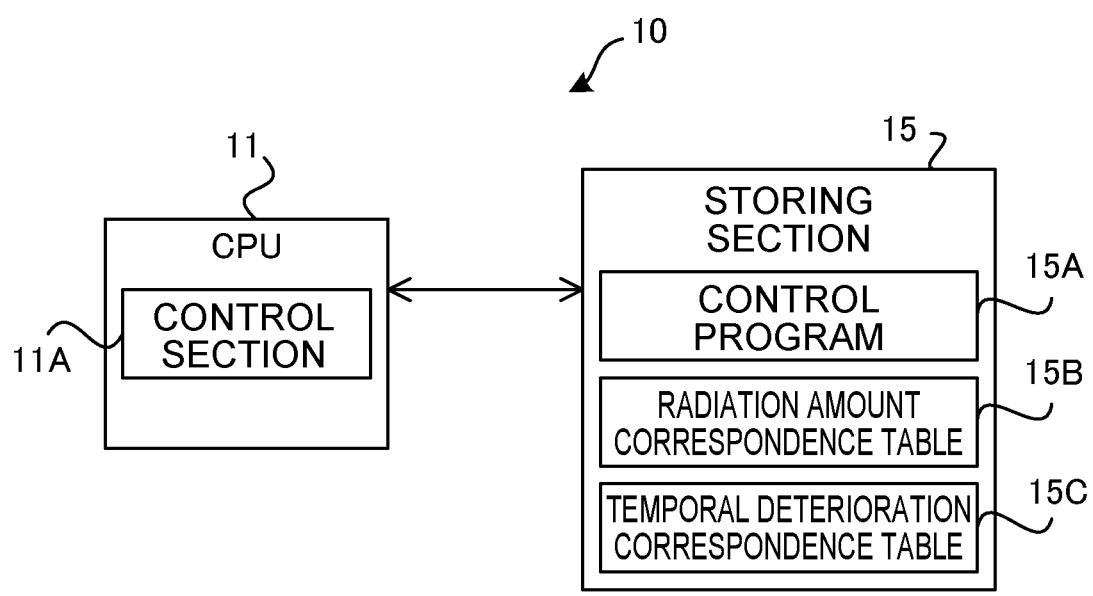
FIG. 3 is a block drawing illustrating an example of functional structures of the control device relating to the first exemplary embodiment.

Therefore, the CPU 11 of the control device 10 relating to the first exemplary embodiment functions as the respective sections illustrated in FIG. 3, due to the CPU 11 writing the control program 15A, which is stored in the ROM 12 or the storing section 15, into the RAM 13 and executing the control program 15A.

FIG. 3 is a block drawing illustrating an example of the functional structure of the control device 10 relating to the first exemplary embodiment.

As illustrated in FIG. 3, the CPU 11 of the control device 10 relating to the present exemplary embodiment functions as a control section 11A. Note that a radiation amount correspondence table 15B and a temporal deterioration correspondence table 15C are stored in the storing section 15.

On the basis of error information of the DC/DC converter 30 that is an example of the electric power supplying device, the control section 11A estimates the amount of radiation with respect to the DC/DC converter 30. Note that the "amount of radiation" is expressed as the dose rate of the radiation for example. "Error information" means information relating to processings at the time of an abnormal state of the DC/DC converter 30. Specifically, the control section 11A compares data used at the DC/DC converter 30 and data for comparison, and determines whether or not the data coincide. Here, in a case in which bit inversion of the data used at the DC/DC converter 30 arises due to effects of radiation and/or noise, the data used at the DC/DC converter 30 and the data for comparison do not match. In a case in which it is determined that the data used at the DC/DC converter 30 and the data for comparison do not match, bit correction of the data used at the DC/DC converter 30 is carried out. The control section 11A holds, in advance, a relationship of correspondence between radiation amounts and numbers of times of bit correction per unit time, and, by using this relationship of correspondence, estimates the radiation amount from the number of times of bit correction per unit time that is actually measured.

Note that, although the above describes an example of a case in which the number of times of bit correction is acquired as the error information, the present disclosure is not limited to this. Information other than the number of times of bit correction may be acquired as the error information. For example, the number of times of resetting of or the number of times of restarting of the DC/DC converter 30 may be acquired as the error information.

The radiation amount correspondence table 15B is a data table in which appropriate first supplied electric power maximum values WA are set in advance in association with values of or ranges of radiation amounts for the DC/DC converter 30. When the radiation amount with respect to the DC/DC converter 30 is estimated at a given time, the radiation amount correspondence table 15B is referred to on the basis of the estimated radiation amount, and the first supplied electric power maximum value WA is computed.

The temporal deterioration correspondence table 15C is a data table in which appropriate second supplied electric power maximum values WB are set in advance in association with temporal changes from the BOL (Beginning of Life) that expresses the initial state before deterioration due to radiation, to the EOL (End of Life) that expresses a state after deterioration, for the DC/DC converter 30. The temporal deterioration correspondence table 15C is referred to at the time when the radiation amount with respect to the DC/DC converter 30 is estimated, and the second supplied electric power maximum value WB is computed.

On the basis of the first supplied electric power maximum value WA that is computed in accordance with the radiation amount with respect to the DC/DC converter 30, and the second supplied electric power maximum value WB that is computed from the temporal deterioration of the DC/DC converter 30, the control section 11A determines an electric power supply maximum value WU that is the maximum value of the electric power that is to be supplied from the DC/DC converter 30 to at least one of the first device 51 and the second device 52. For example, when the radiation amount is estimated at a given time, the lower of, the first supplied electric power maximum value WA and the second supplied electric power maximum value WB, may be determined as the electric power supply maximum value WU.

Further, in a case in which the radiation amount that is estimated at a given time is less than a threshold value Th, the control section 11A may determine the second supplied electric power maximum value WB as the electric power supply maximum value WU, and, in a case in which the radiation amount is greater than or equal to the threshold value Th, the control section 11A may determine the lower of the first supplied electric power maximum value WA and the second supplied electric power maximum value WB as the electric power supply maximum value WU. A concrete method of determining the electric power supply maximum value WU is described hereinafter with reference to FIG. 4.

Figure 4:
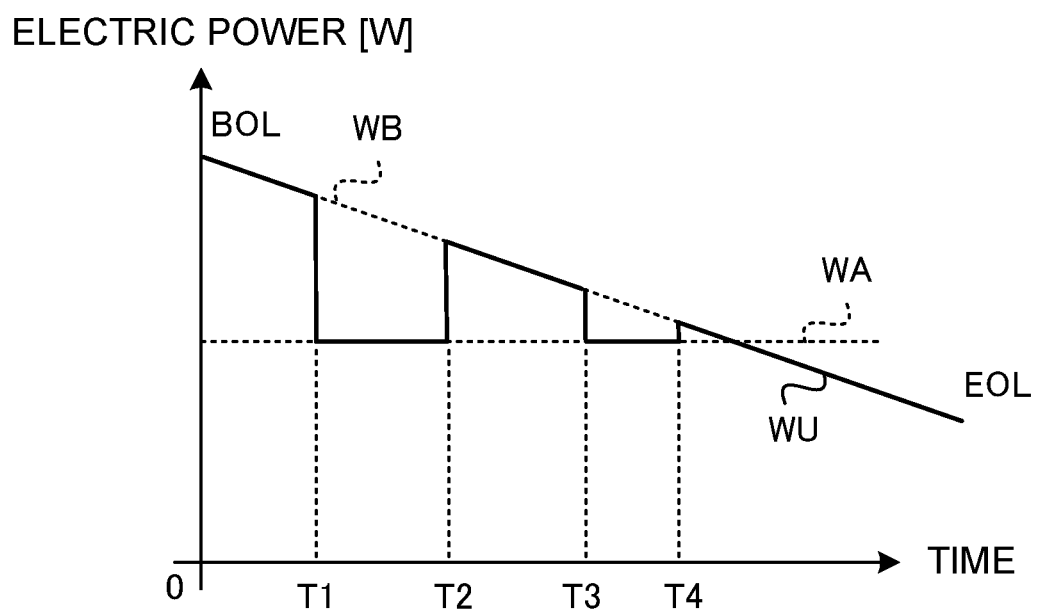
FIG. 4 is a graph provided for explanation of a method of determining an electric power supply maximum value relating to the first exemplary embodiment.

FIG. 4 is a graph provided for explaining the method of determining the electric power supply maximum value WU relating to the first exemplary embodiment. In the graph of FIG. 4, electric power is shown on the vertical axis, and time is shown on the horizontal axis.

The first supplied electric power maximum value WA illustrated in FIG. 4 expresses the supplied electric power maximum value at the time when the radiation amount is greater than or equal to the threshold value Th (i.e., when the radiation amount is relatively great) and is data obtained from the radiation amount correspondence table 15B. On the other hand, the second supplied electric power maximum value WB expresses the supplied electric power maximum value that corresponds to temporal deterioration from BOL to EOL, and is data obtained from the temporal deterioration correspondence table 15C.

In FIG. 4, the interval from time 0 to time T1, in which the radiation amount with respect to the DC/DC converter 30 is estimated, is an interval in which the estimated radiation amount is less than the threshold value Th (i.e., in which the radiation amount is not that great). Therefore, the second supplied electric power maximum value WB is employed, and a value, which is obtained from the second supplied electric power maximum value WB in accordance with the time at which the radiation amount is estimated, is determined as the electric power supply maximum value WU.

Further, the interval from time T1 to time T2, in which the radiation amount with respect to the DC/DC converter 30 is estimated, is an interval in which the estimated radiation amount is greater than or equal to the threshold value Th (i.e., in which the radiation amount is relatively great). Therefore, the lower of the first supplied electric power maximum value WA and the second supplied electric power maximum value WB (in the example of FIG. 4, the first supplied electric power maximum value WA) is employed, and a value, which is obtained from the first supplied electric power maximum value WA in accordance with the time at which the radiation amount is estimated, is determined as the electric power supply maximum value WU.

Further, the interval from time T2 to time T3, in which the radiation amount with respect to the DC/DC converter 30 is estimated, is an interval in which the estimated radiation amount is less than the threshold value Th (i.e., in which the radiation amount is not that great). Therefore, the second supplied electric power maximum value WB is employed, and a value, which is obtained from the second supplied electric power maximum value WB in accordance with the time at which the radiation amount is estimated, is determined as the electric power supply maximum value WU.

Further, the interval from time T3 to time T4, in which the radiation amount with respect to the DC/DC converter 30 is estimated, is an interval in which the estimated radiation amount is greater than or equal to the threshold value Th (i.e., in which the radiation amount is relatively great). Therefore, the lower of the first supplied electric power maximum value WA and the second supplied electric power maximum value WB (in the example of FIG. 4, the first supplied electric power maximum value WA) is employed, and a value, which is obtained from the first supplied electric power maximum value WA in accordance with the time at which the radiation amount is estimated, is determined as the electric power supply maximum value WU.

Operation of the control device 10 relating to the first exemplary embodiment is described with reference to FIG. 5.

Figure 5:
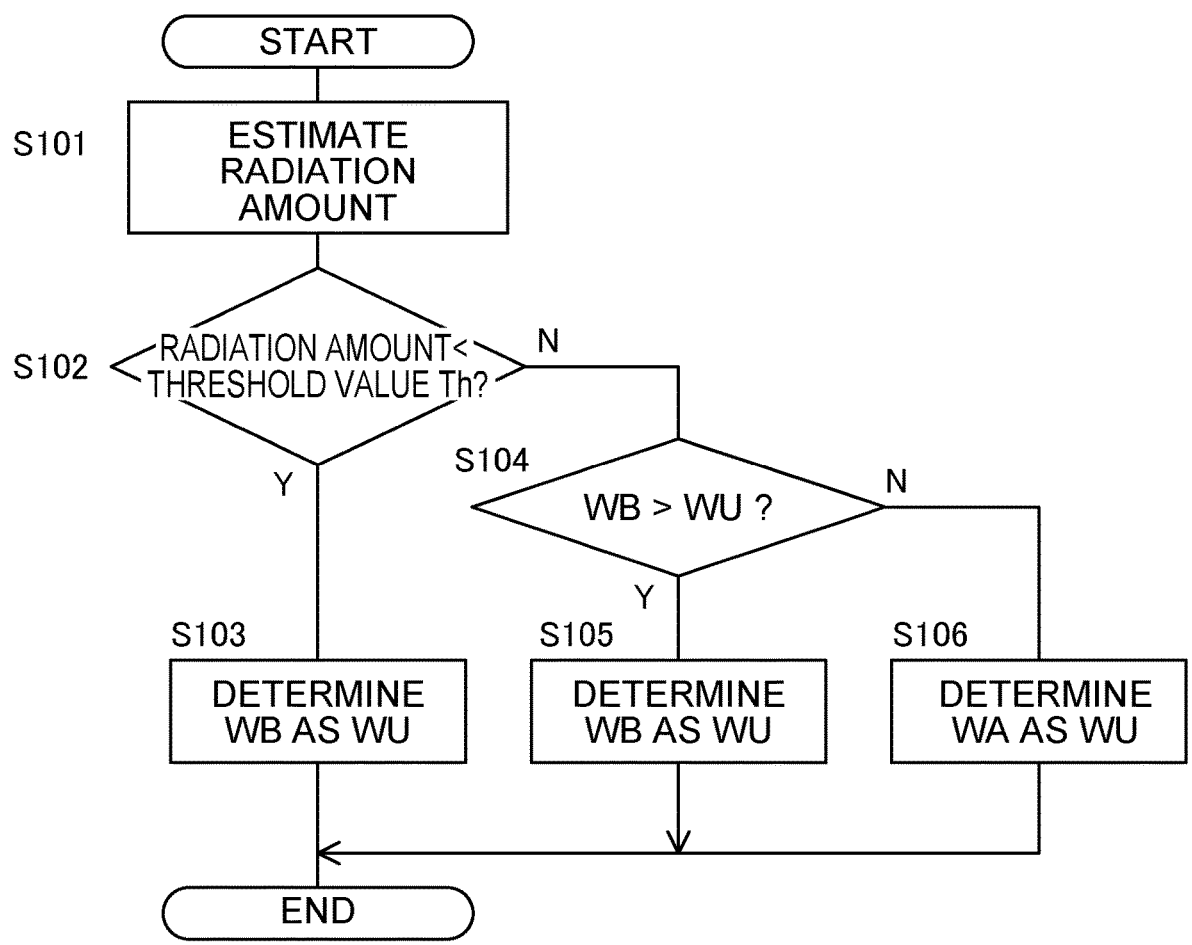
FIG. 5 is a flowchart illustrating an example of the flow of processings by a control program relating to the first exemplary embodiment.

FIG. 5 is a flowchart illustrating an example of the flow of processings by the control program 15A relating to the first exemplary embodiment.

First, when the control device 10 is instructed to execute electric power supply maximum value determining processing, the control program 15A is started by the CPU 11, and the following respective processings are executed.

In step S101 of FIG. 5, on the basis of error information of the DC/DC converter 30 at a predetermined time for example, the CPU 11 estimates the radiation amount with respect to the DC/DC converter 30.

In step S102, the CPU 11 determines whether or not the radiation amount estimated in step S101 is less than the threshold value Th. If it is determined that the radiation amount is less than the threshold value Th (i.e., in the case of an affirmative determination), the CPU 11 proceeds to step S103. If it is determined that the radiation amount is greater than or equal to the threshold value Th (i.e., in the case of a negative determination), the CPU 11 proceeds to step S104.

In step S103, as an example, as illustrated in above-described FIG. 4, the CPU 11 determines the second supplied electric power maximum value WB as the electric power supply maximum value WU, and ends the series of processings by the present control program 15A.

On the other hand, in step S104, as an example, as illustrated in above-described FIG. 4, the CPU 11 determines whether or not the first supplied electric power maximum value WA is greater than the second supplied electric power maximum value WB. If it is determined that the first supplied electric power maximum value WA is greater than the second supplied electric power maximum value WB (i.e., in the case of an affirmative determination), the CPU 11 proceeds to step S105. If it is determined that the first supplied electric power maximum value WA is less than or equal to the second supplied electric power maximum value WB (i.e., in the case of a negative determination), the CPU 11 proceeds to step S106.

In step S105, as an example, as illustrated in above-described FIG. 4, the CPU 11 determines the second supplied electric power maximum value WB as the electric power supply maximum value WU, and ends the series of processings by the present control program 15A.

On the other hand, in step S106, as an example, as illustrated in above-described FIG. 4, the CPU 11 determines the first supplied electric power maximum value WA as the electric power supply maximum value WU, and ends the series of processings by the present control program 15A.

As described above, in accordance with the present exemplary embodiment, on the basis of a first supplied electric power maximum value that is computed in accordance with the radiation amount with respect to an electric power supplying device, and a second supplied electric power maximum value that is computed in accordance with the temporal deterioration of the electric power supplying device, an electric power supply maximum value, which is the maximum value of the electric power that is to be supplied from the electric power supplying device to at least one external device, is determined. Due thereto, the appropriate electric power that may be outputted in an environment in which the effects of radiation are great can be determined.

Second Exemplary Embodiment

A second exemplary embodiment describes a form in which appropriate peak shifting control is carried out by using the electric power supply maximum value WU that was determined in the above-described first exemplary embodiment.

Figure 6:
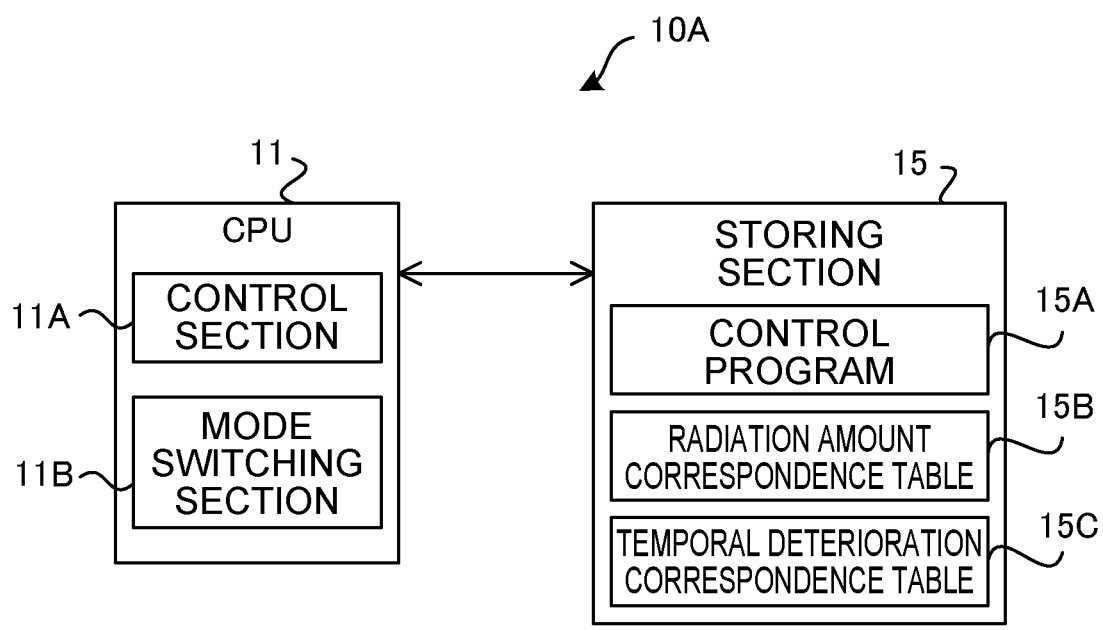
FIG. 6 is a block drawing illustrating an example of functional structures of a control device relating to a second exemplary embodiment.

FIG. 6 is a block drawing illustrating an example of the functional structures of a control device 10A relating to the second exemplary embodiment.

As illustrated in FIG. 6, the CPU 11 of the control device 10A relating to the present exemplary embodiment functions as the control section 11A and a mode switching section 11B.

The control section 11A controls the DC/DC converter 30 such that electric power is supplied simultaneously to the first device 51 and the second device 52, within a range in which the electric power supply maximum value WU is not exceeded. Specifically, the ON/OFF timing of the R/B 40 is controlled so as to shift the peaks of the electric powers. This control mode is a mode that prioritizes activation times of the devices over the lifespans of the devices, and is called the "activation priority mode" hereinafter. In the activation priority mode, the electric powers to the first device 51 and the second device 52 respectively are supplied so as to be divided over plural times until the respective activations are completed. "Supplying electric power simultaneously" means that, among the plural times that electric power is supplied, simultaneous supplying of electric power is carried out one or more times.

Further, the control section 11A controls the DC/DC converter 30 such that electric powers to the first device 51 and the second device 52 respectively are supplied so as to be shifted temporally, within a range in which the electric power supply maximum value WU is not exceeded. Specifically, in the same way as described above, the ON/OFF timing of the R/B 40 is controlled so as to shift the peaks of the electric powers. This control mode is a mode that prioritizes the lifespans of the devices over the activation times of the devices, and is called the "life priority mode" hereinafter. In the life priority mode, in the same way as in the activation priority mode, the electric powers to the first device 51 and the second device 52 respectively are supplied so as to be divided over plural times until the respective activations are completed. "Supplying electric powers so as to be shifted temporally" means that the plural times of supplying electric power are all offset.

The mode switching section 11B selectively switches the above-described activation priority mode and life priority mode. For example, the switching of the mode may be switching in accordance with a command from a ground station, or may be switching automatically in accordance with a determination on the situation of the moving body 100. With regard to situations of the moving body 100, for example, it can be contemplated that the mode is switched to the activation priority mode in a situation in which the moving body 100 must be activated quickly in accordance with the contents of the mission in space, and the mode is switched to the life priority mode in other situations.

Figure 7:
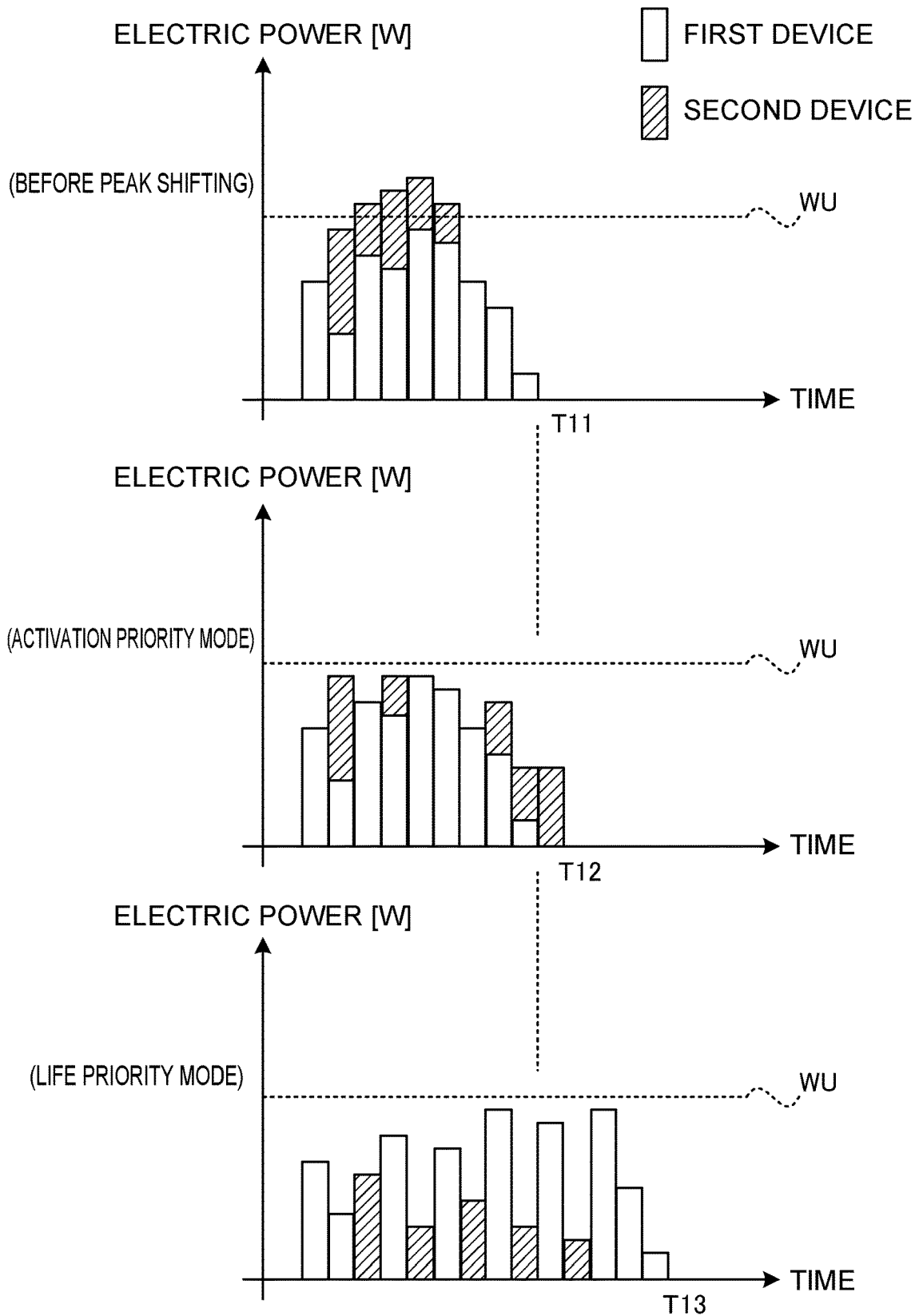
FIG. 7 is a graph provided for explaining peak shifting control in accordance with an activation priority mode and a life priority mode relating to the second exemplary embodiment.

FIG. 7 is graphs provided for explaining peak shifting control in accordance with the activation priority mode and the life priority mode relating to the second exemplary embodiment. In the graphs of FIG. 7, electric power is shown on the vertical axis, and time is shown on the horizontal axis.

As illustrated in FIG. 7, in the "before peak shifting", electric power is supplied simultaneously to the first device 51 and the second device 52 over plural times, and the activations of the first device 51 and the second device 52 are illustrated as being completed at time T11. However, some of the supplying of electric power among the electric power supplying of the plural times exceed the electric power supply maximum value WU. At this time, from the state of "before peak shifting", the mode is switched to the "activation priority mode" or the "life priority mode", and peak shifting control is carried out such that the electric power supply maximum value WU is not exceeded.

In the "activation priority mode", electric power is supplied simultaneously to the first device 51 and the second device 52 over plural times, within a range of not exceeding the electric power supply maximum value WU, and the activations of the first device 51 and the second device 52 are illustrated as being completed at time T12 (>T11). In this case, in order to make the activation completion time be the shortest within a range of not exceeding the electric power supply maximum value WU, the timing of supplying electric power to the second device 52 is controlled such that the peaks are offset. Note that the timing of supplying electric power to the second device 52 is controlled in the example of FIG. 7, but the timing of supplying electric power to the first device 51 may be controlled.

In the "life priority mode", electric power is supplied to the first device 51 and the second device 52 over plural times so as to be shifted temporally, within a range of not exceeding the electric power supply maximum value WU, and the activations of the first device 51 and the second device 52 are illustrated as being completed at time T13 (>T12). In this case, in order to minimize the electric power supply (load) per time period within a range of not exceeding the electric power supply maximum value WU, the timings of supplying electric power to the first device 51 and the second device 52 respectively are controlled such that the peaks are offset.

Here, the actual output performance is determined appropriately at a given device. Given that the activation time in a case of carrying out optimal control is $T_{op}$, and the activation time in a case of keeping the output performance excessively small is $T_{ue}$, the effect $\Delta T$ of shortening the activation time is expressed by the following formula.

$$\Delta T = T_{ue} - T_{op}$$

Further, given that the device life is $L_{op}$, and the device life in a case in which the output performance is made to be excessively large is $L_{oe}$, the effect $\Delta L$ on lengthening the life is expressed by the following formula.

$$\Delta L = L_{op} - L_{oe}$$

As described above, in accordance with the present exemplary embodiment, appropriate peak shifting control may be carried out by using the electric power supply maximum value determined in the above-described first exemplary embodiment. In the activation priority mode, by supplying electric powers altogether, shortening of the activation time is possible. In the life priority mode, by keeping the consumed electric power per time period low, lengthening of the life is possible.

Note that, in the above-described respective exemplary embodiments, processor means a processor in the broad sense, and includes general-purpose processors (e.g., a CPU: Central Processing Unit, or the like), processors for dedicated uses (e.g., a GPU: Graphics Processing Unit, an ASIC: Application Specific Integrated Circuit, an FPGA: Field Programmable Gate Array, a programmable logic device, and the like).

The operations of the processor in the above-described respective exemplary embodiments may not only be carried out by one processor, but may be carried out by the cooperation of plural processors that exist at positions that are apart physically. Further, the order of the respective operations of the processor is not limited to only the order described in the above respective exemplary embodiments, and may be changed appropriately.

Control devices relating to exemplary embodiments, and a moving body equipped with the control device, have been described above. The exemplary embodiments may be in the form of a program for causing a computer to execute the functions of the control device. The exemplary embodiments may be in the form of a computer-readable, non-transitory storage medium that stores these programs.

In addition, the structures of the control devices described in the above exemplary embodiments are examples, and can be changed in accordance with the situation within a scope that does not depart from the gist of the present disclosure.

The flows of the processings of the programs described in the above exemplary embodiments also are examples, and unnecessary steps may be deleted therefrom, new steps may be added thereto, or the order of processings may be rearranged, with a scope that does not depart from the gist of the present disclosure.

The above exemplary embodiments describe cases in which the processings relating to the exemplary embodiments are realized by software structures using a computer, by executing programs. However, the present disclosure is not limited to this, and the exemplary embodiments may be realized by, for example, hardware structures, or combinations of hardware structures and software structures.

What is claimed is:

1. A control device comprising:
 a memory; and
 a processor coupled to the memory, the processor configured to:
 on the basis of a first supplied electric power maximum value computed in accordance with a radiation amount with respect to an electric power supplying device, and a second supplied electric power maximum value computed from temporal deterioration of the electric power supplying device, determine an electric power supply maximum value that is a maximum value of electric power to be supplied from the electric power supplying device to at least one external device;
 in a case in which the radiation amount is less than a threshold value, determine the second supplied electric power maximum value as the electric power supply maximum value, and
 in a case in which the radiation amount is greater than or equal to the threshold value, determine the lower of the first supplied electric power maximum value and the second supplied electric power maximum value as the electric power supply maximum value.

2. The control device of claim 1, wherein the processor is configured to control the electric power supplying device to supply electric power simultaneously to a plurality of external devices within a range in which the electric power supply maximum value is not exceeded.

3. The control device of claim 1, wherein the processor is configured to control the electric power supplying device to supply electric power to a plurality of external devices respectively in a manner of being shifted temporally, within a range in which the electric power supply maximum value is not exceeded.

4. The control device of claim 1, wherein the processor is configured to estimate the radiation amount with respect to the electric power supplying device on the basis of error information of the electric power supplying device.

5. A moving body comprising:
 the control device of any one of claim 1; wherein the electric power supplying device controlled by the control device.

6. A control method comprising:
 on the basis of a first supplied electric power maximum value computed in accordance with a radiation amount with respect to an electric power supplying device, and a second supplied electric power maximum value computed from temporal deterioration of the electric power supplying device, determining, by a control device, an electric power supply maximum value that is a maximum value of electric power to be supplied from the electric power supplying device to at least one external device;

in a case in which the radiation amount is less than a threshold value, determining the second supplied electric power maximum value as the electric power supply maximum value, and in a case in which the radiation amount is greater than or equal to the threshold value, determining the lower of the first supplied electric power maximum value and the second supplied electric power maximum value as the electric power supply maximum value.

7. A non-transitory computer-readable medium storing a control program for causing a computer to execute a process, the process comprising:

on the basis of a first supplied electric power maximum value computed in accordance with a radiation amount with respect to an electric power supplying device, and a second supplied electric power maximum value computed from temporal deterioration of the electric power supplying device, determining an electric power supply maximum value that is a maximum value of electric power to be supplied from the electric power supplying device to at least one external device;

in a case in which the radiation amount is less than a threshold value, determining the second supplied electric power maximum value as the electric power supply maximum value, and in a case in which the radiation amount is greater than or equal to the threshold value, determining the lower of the first supplied electric power maximum value and the second supplied electric power maximum value as the electric power supply maximum value.

* * * * *